United States Patent
Roth

(10) Patent No.: US 10,723,279 B2
(45) Date of Patent: Jul. 28, 2020

(54) METHOD FOR OPERATING A MOTOR VEHICLE AND MOTOR VEHICLE

(71) Applicant: AUDI AG, Ingolstadt (DE)

(72) Inventor: Andreas Roth, Kipfenberg/Böhming (DE)

(73) Assignee: AUDI AG, Ingolstadt (DE)

( * ) Notice: Subject to any disclaimer, the term of this patent is extended or adjusted under 35 U.S.C. 154(b) by 189 days.

(21) Appl. No.: 16/047,337

(22) Filed: Jul. 27, 2018

(65) Prior Publication Data
US 2019/0054863 A1   Feb. 21, 2019

(30) Foreign Application Priority Data
Aug. 18, 2017  (DE) .......... 10 2017 007 849

(51) Int. Cl.
| | |
|---|---|
| B60R 11/00 | (2006.01) |
| B60J 3/02 | (2006.01) |
| B60R 7/05 | (2006.01) |
| B60R 16/037 | (2006.01) |

(52) U.S. Cl.
CPC .......... B60R 11/00 (2013.01); B60J 3/0282 (2013.01); B60R 7/05 (2013.01); B60R 16/0373 (2013.01); B60R 2011/0035 (2013.01)

(58) Field of Classification Search
None
See application file for complete search history.

(56) References Cited

U.S. PATENT DOCUMENTS

| | | | | |
|---|---|---|---|---|
| 2017/0008381 | A1* | 1/2017 | Huelke | ............ B60R 7/05 |
| 2017/0013188 | A1* | 1/2017 | Kothari | ........ H04N 5/23293 |
| 2017/0106728 | A1* | 4/2017 | Nania | ............ B60J 3/0243 |
| 2019/0232866 | A1* | 8/2019 | Holland | ............ B60Q 3/252 |

FOREIGN PATENT DOCUMENTS

| | | |
|---|---|---|
| DE | 10057265 A1 | 6/2001 |
| DE | 102004007521 A1 | 2/2005 |
| DE | 102015103194 A1 | 9/2015 |

OTHER PUBLICATIONS

German Office Action dated Apr. 5, 2018 of corresponding application No. DE102017007849.1; 8 pgs.

* cited by examiner

*Primary Examiner* — Jonathan M Dager
*Assistant Examiner* — Garrett F Evans
(74) *Attorney, Agent, or Firm* — Maier & Maier, PLLC

(57) ABSTRACT

A method for operating a motor vehicle, in which a control device of the motor vehicle receives a control input conducted by a vehicle occupant. By means of a sensor device of the motor vehicle, it is checked whether at least one predetermined criterion is met. When the at least one predetermined criterion is met and when the control input is received, the control device brings about a movement of at least one sun visor of the motor vehicle from a stowed position into a functional position, in which the at least one sun visor is flipped down. Furthermore, the invention relates to a motor vehicle.

9 Claims, 2 Drawing Sheets

METHOD FOR OPERATING A MOTOR VEHICLE AND MOTOR VEHICLE

FIELD

Figure 1:
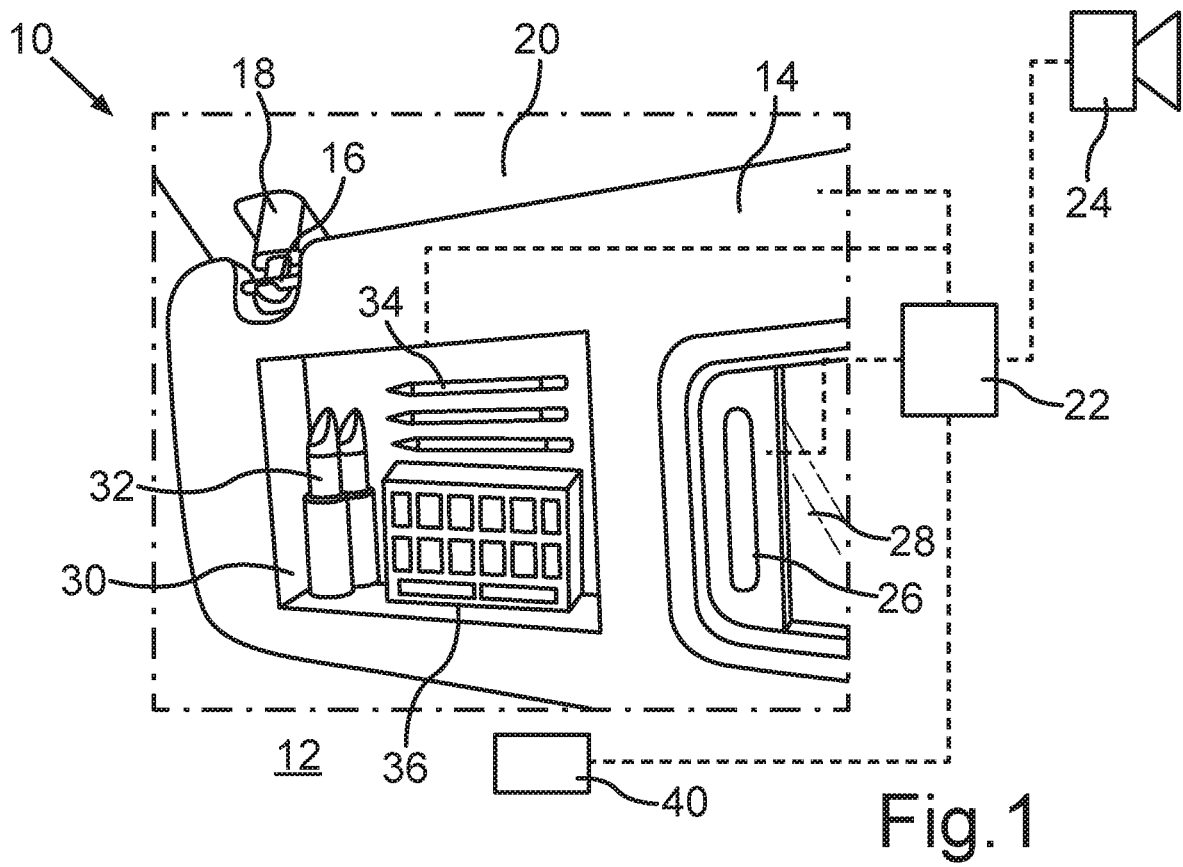

The invention relates to a method for operating a motor vehicle, in which a control device of the motor vehicle receives a control input conducted by a vehicle occupant. The invention further relates to a motor vehicle.

BACKGROUND

In street traffic, it happens that female drivers of motor vehicles flip down a sun visor and look at themselves in the vanity mirror attached to the sun visor in order to check their makeup and, if need be, to touch it up or to improve it. However, this is tedious and awkward. First of all, the sun visor has to be flipped down by hand. Subsequently, makeup accessories are sought in the glove compartment or in diverse storage places of the motor vehicle and then still also have to be taken out and utilized. In addition, this demands relatively a good deal of time, during which the female driver is distracted from traffic events.

SUMMARY

Therefore, the object of the present invention is to create an improved method of the kind mentioned in the introduction and a motor vehicle designed for carrying out such a method.

In the method according to the invention for operating a motor vehicle, a control device of the motor vehicle receives a control input conducted by a vehicle occupant. By means of a sensor device of the motor vehicle, it is checked whether at least one predetermined criterion is met. When this at least one predetermined criterion is met and when the control input is received, the control device brings about a movement of at least one sun visor of the motor vehicle from a stowed position into a functional position. In the functional position, the at least one sun visor is flipped down. Owing to the fact that, by means of the sensor device of the motor vehicle, it is checked whether the predefined criterion is met, the sun visor is not flipped down just upon receiving the control input of the vehicle occupant. In this way, it can be ensured that the sun visor is flipped down only when this does not pose any problems in regard to the traffic situation, that is, for instance, when a driving speed of the motor vehicle is slowed and the motor vehicle will soon come to a standstill. Consequently, an improved method is created.

In addition, it is possible for the vehicle occupant, in particular a female vehicle occupant, for instance, to utilize more quickly a mirror attached to the sun visor in order to check her makeup, for example, without it being necessary for the vehicle occupant to flip down the sun visor herself for this purpose. Consequently, it is possible to check the makeup and, if need be, to correct or improve the makeup very quickly. In this way, interference in traffic events is avoided.

Preferably, by means of a motor vehicle sensor device that is designed as a camera, it is checked, as the at least one predefined criterion, whether the motor vehicle is approaching a traffic signal that displays a red light signal or that will display a red light signal by the time the motor vehicle reaches the traffic signal. The meeting of these criteria can preferably be checked by evaluating image data recorded by a front camera of the motor vehicle, in particular by means of the control device. In this way, it can be ensured that the sun visor is flipped down only when it can be assumed that, in the near future, the motor vehicle will stop at the traffic signal and will stand there for a period of time. Then, namely, the checking of the makeup or the equivalent is particularly not a problem. In addition, the sun visor does not need to be brought by hand into the functional position, that is, flipped down, since an actuator in the form of an electric motor, for instance, which is controlled by the control device, provides for this.

Preferably, the control device brings about a movement of a cover of a mirror attached to the at least one sun visor from a closed position of the cover into an open position of the cover. This can also be accomplished by control of an actuator that moves the cover. In addition, the cover can already be moved into the open position while the sun visor is being flipped down. In this way, the mirror is very quickly ready for the (female) vehicle occupant when, for instance, she wishes to check her makeup and/or put it in order. Such an automatic uncovering of the mirror is especially convenient for the vehicle occupant.

When the cover of the mirror is moved into the open position, preferably at least one light source is switched on, so that the vehicle occupant is able to see herself in the mirror especially well.

It has found to be further advantageous when the control device brings about an opening of a storage compartment that contains makeup accessories and is formed in the at least one sun visor. In this way, the makeup accessories are directly and simply accessible to the vehicle occupant, in particular to a female driver of the motor vehicle.

The makeup accessories can comprise facial tissues, powder, lipstick, eyeshadow, an eyeliner pencil or eyeliner, or the like. Through the arrangement of the makeup accessories in the storage compartment formed in the sun visor, a uniform and defined positioning of the makeup accessories in the motor vehicle is achieved, so that a simple handling ensues for the person or the vehicle occupant utilizing the makeup accessories. In addition, any unnecessary bending forward while searching for makeup accessories in compartments or in a purse or the like is avoided. Moreover, the vehicle occupant does not need to stretch in an awkward way in order to reach makeup accessories stored in a glove compartment or the like. Instead, the makeup accessories that are stored in the storage compartment and, in particular, are fixed in place or held by means of suitable holders are very easily and simply accessible to the vehicle occupant.

In addition, through the provision of the storage compartment for the makeup accessories in the sun visor, the intrinsic value of the sun visor is substantially increased. For female vehicle occupants, premium products of this kind are especially appealing and can produce an allure. In addition, it is possible in the region of the sun visor—for example, where usually an informational notice warning about the activation of an airbag on the passenger seat is attached—to accommodate the storage compartment especially well. Furthermore, the appearance of the flipped-down sun visor on its side facing the vehicle occupant is improved when, instead of the airbag informational notice, the storage compartment with the makeup accessories is arranged there. The airbag informational notice can then be arranged, for example, at a place on a roof liner of the motor vehicle that is covered by the sun visor when the sun visor is flipped up and/or in or at a glove compartment of the motor vehicle.

In the storage compartment, it is also possible to arrange a container, which can be removed from the storage compartment and accordingly can be simply furnished with the makeup accessories desired by the vehicle occupant. However, it can also be provided that the container is already furnished with certain makeup accessories when the motor vehicle, as a new car, is handed over to a vehicle user. In particular, it can be provided that the furnishing of the storage compartment and/or of the containers that are arranged or loosely accommodated in the storage compartment can be configured by the user of the motor vehicle more or less extensively, depending on a desired line of accessories. It is thus possible in a simple manner to accommodate different demands of the vehicle occupant in regard to the makeup accessories.

Preferably, through the control device, an opening of a container that is accommodated in the storage compartment and contains makeup accessories is brought about. For example, a container in the form of a cosmetic case can be accommodated in a detachable manner in the storage compartment and the container is usually closed by means of a lid. When the control device then brings about the opening of the lid, a simple access to the makeup accessories is possible for the vehicle occupant.

Through removal of the container from the storage compartment, a mirror that is arranged in the storage compartment can be exposed. Preferably, the mirror that is arranged at a bottom of the storage compartment, for instance, magnifies objects it mirrors to a greater extent than another mirror that is attached to the sun visor and is covered by means of a cover. Such a magnifying mirror makes the handling of makeup accessories simpler, faster and safer in their implementation.

Furthermore, it can be provided that such a magnifying mirror is arranged as a second mirror beneath the mirror that is covered by means of the cover. Preferably, in this case, by means of the control device, the magnifying mirror is exposed by pushing aside the mirror arranged in front of or over the magnifying mirror, which can be covered by means of the cover. This can be triggered, in particular, by taking from the storage compartment at least one makeup accessory and/or the container containing the makeup accessories.

It is especially convenient when the control input is conducted as a voice input by the vehicle occupant. For example, the vehicle occupant voices a command, such as, "Makeup" or "Day makeup look on", and this command is received or recognized by the control device. In response to this command, the sun visor is then moved into the functional position or flipped down, provided that the at least one predefined criterion is met. Through a command such as "End makeup" or "Makeup finished," it can be brought about, at the wish of the vehicle occupant, that the sun visor is moved again into its stowed position, that is, is flipped up. Therefore, it is possible to produce an automatic flip-up function and/or closing function, in particular with voice input.

Additionally or alternatively, the control input can be made as an input on a control element of the motor vehicle, for instance on a touchpad and/or on a touchscreen. It is also possible through such a control input and/or through a pushbutton actuation to ensure simply and reliably that the control device of the motor vehicle receives the control input, which finally leads to the sun visor being flipped down.

Additionally or alternatively, the control input can be made as an input on a mobile end device coupled to the control device. For example, the control input can be transmitted to the control device via an application on a mobile end device in the form of a smartphone, a tablet, or the like. The control device can be coupled—in particular, wirelessly—to the mobile end device, for example, via Bluetooth, WLAN, or the equivalent. The movement of the sun visor into the functional position can also be brought about in a simple manner.

Preferably, it is checked by means of a device for detecting a seat occupancy whether a driver's seat of the motor vehicle is occupied. When the driver's seat is occupied, at least one sun visor associated with the driver's seat is moved into the functional position. It is then possible, in particular, for a female driver sitting in the driver's seat to check and/or touch up her makeup when the sun visor is automatically flipped down and exposed.

In particular, when only the driver's seat of the motor vehicle is occupied, the control device can very easily establish which sun visor is to be brought into the functional position for checking makeup. However, it can also happen that both the driver's seat and also at least one vehicle seat different from the driver's seat of the motor vehicle are occupied.

Preferably, therefore, it is checked by means of a device for detecting a seat occupancy whether at least one vehicle seat different from the driver's seat of the motor vehicle is occupied. When the at least one vehicle seat is occupied, at least one additional control input of a vehicle occupant is evaluated by the control device. This additional control input specifies which sun visor is to be moved into the functional position. In particular, for a communication with the control device via voice input, where the control device is also designed for voice output, it is possible, in response to the voice input in the form of a command such as "Makeup," for the control device to ask the vehicle occupant where in the motor vehicle the sun visor is to be flipped down. The vehicle occupant can then, by way of the additional control input, specify this place through a voice input such as "Passenger seat" or else "Front right," "Back right," "Back left," Back middle," or the like. Such additional control inputs of the vehicle occupant can be conducted, however, in a way differing from voice input by way of a control element of the motor vehicle or by way of a mobile end device coupled to the control device, for instance.

Through the evaluation of the additional control input, it can be ensured simply and quickly by the control device that the sun visor desired by the vehicle occupant because it can be utilized by this occupant is brought into the functional position.

Finally, it has been found to be advantageous when, once it has been detected by means of the device that at least one vehicle seat that is arranged behind a driver's seat of the motor vehicle in the longitudinal direction of the vehicle is occupied, a hinged element assigned to said vehicle seat is moved into a functional position. In the functional position, the hinged element is flipped down from the roof liner of the motor vehicle, for instance. The control device then brings about an opening of a storage compartment that is formed in the hinged element and contains makeup accessories. In this way, it is possible for vehicle occupants of a second or third row of seats to have simple access to makeup accessories. A container that contains the makeup accessories can also be arranged in the storage compartment that is formed in the hinged element.

The motor vehicle according to the invention comprises a control device, which is designed for receiving a control input conducted by a vehicle occupant.

Furthermore, the motor vehicle comprises a sensor device,[1] by means of which it can be checked whether at least one predetermined criterion is met. The control device is designed for bringing about a movement of at least one sun visor of the motor vehicle from a stowed position into a functional position when at least one predefined criterion is met and the control input is received. In the functional position, the at least one sun visor is flipped down. Accordingly, the motor vehicle is designed for carrying out the method, and an improved motor vehicle is created.

The control device has a processor device, which is equipped to carry out the method according to the invention or an embodiment thereof. For this purpose, the processor device can have at least one microprocessor and/or at least one microcontroller. Furthermore, the processor device can have a program code, which is written so as to be executed by the processor device in order to carry out the embodiment of the method according to the invention. The program code can be stored in a data memory of the processor device.

The invention also includes enhancements of the motor vehicle, which have features like those already described in connection with the enhancements of the method. For this reason, the corresponding enhancements of the motor vehicle are not described here once again.

BRIEF DESCRIPTION

Figure 2:
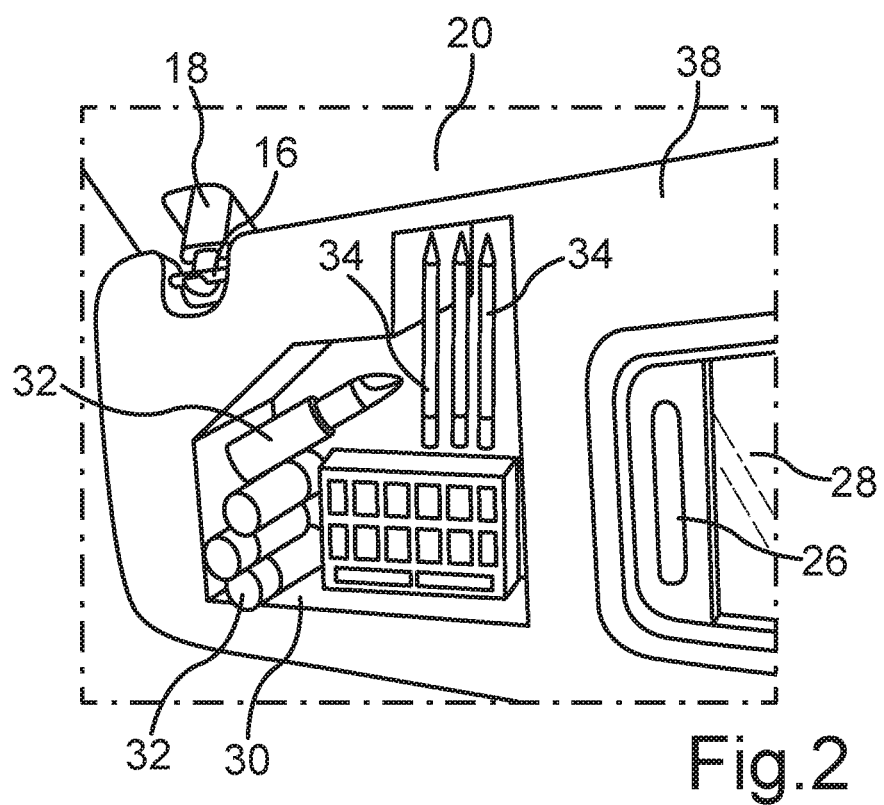
Figure 3:
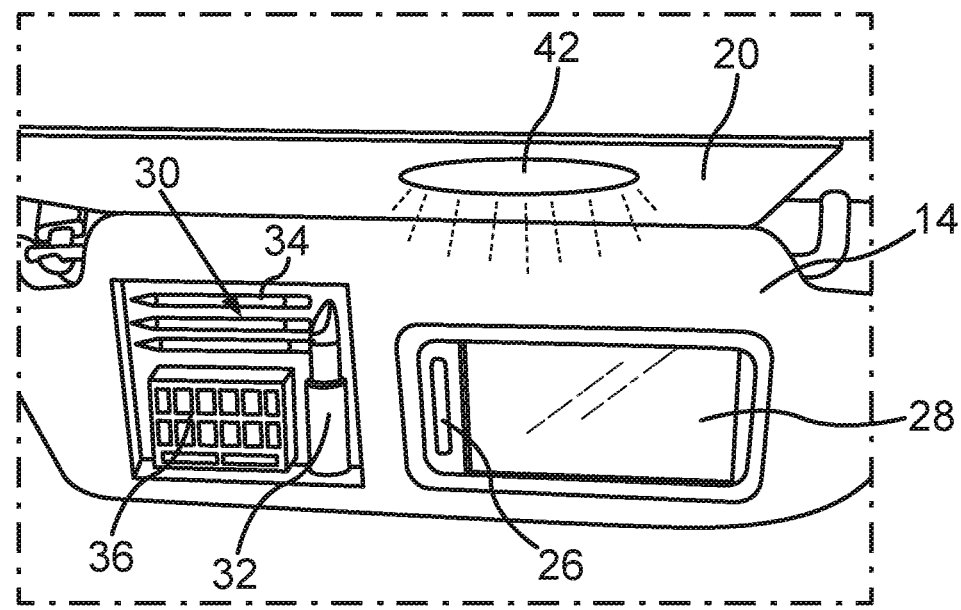
Figure 4:
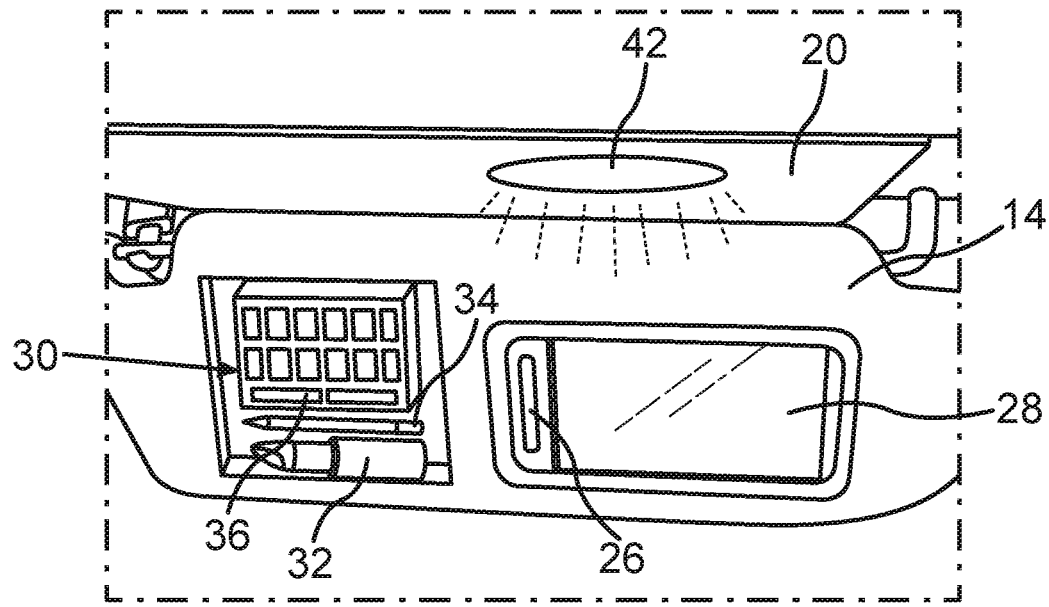

An exemplary embodiment of the invention is described below. Shown for this purpose are:

FIG. 1 by way of an excerpt and in part schematized, a motor vehicle with a flipped-down sun visor, wherein an access to makeup accessories accommodated in the sun visor is made possible;

FIG. 2 schematically, the flipped-down sun visor with makeup accessories accommodated in a storage compartment of the sun visor in accordance with a first exemplary arrangement;

FIG. 3 schematically, the flipped-down sun visor with makeup accessories accommodated in a storage compartment of the sun visor in accordance with a second exemplary arrangement; and FIG. 4 schematically, the flipped-down sun visor with makeup accessories accommodated in a storage compartment of the sun visor in accordance with a third exemplary arrangement.

DETAILED DESCRIPTION

The exemplary embodiment explained below is a preferred embodiment of the invention. In the exemplary embodiment, the described components of the embodiment each represent individual features of the invention, which are to be regarded as being independent of one another and which each further develop the invention independently of one another and accordingly are to be regarded, also individually or in a combination different from that shown, as belonging to the invention. Furthermore, the described embodiment can also be supplemented by features of the invention that are additional to those already described.

In the figures, functionally identical elements are furnished with the same reference numbers.

In FIG. 1, an excerpt of a passenger compartment 12 of a motor vehicle 10 is shown. Arranged in the passenger compartment 12 is a first sun visor 14, which is shown in a flipped-down functional position. Said first sun visor 14 can be pivoted toward a side window (not shown) of the motor vehicle 10 by moving a connecting piece 16 of the first sun visor 14 from a holder 18. Through the connecting piece 16, a pivot axis is formed, around which the first sun visor 14 can be flipped down. When the first sun visor 14 is pivoted toward the side window of the motor vehicle 10, a second sun visor 20 can be flipped down from the roof liner of the motor vehicle 10 and accordingly brought into its functional position.

In the present case, the first sun visor 14 and/or the second sun visor 20 is or are utilized in order to enable a (female) vehicle occupant and, in particular a female driver of the motor vehicle 10, to check or touch up her makeup in a simple way. The method will be described below on the basis of the first sun visor 14, although the method can also be carried out for the second sun visor 20 in an analogous way.

A control device 22 of the motor vehicle 10, shown schematically in FIG. 1, receives a control input from the vehicle occupant, in particular the female driver, in the form of a voice input, for example. For this purpose, the female driver can speak, for instance, the command "Makeup." Subsequently, a sensor device of the motor vehicle 10, which, in the present case, is designed as a camera 24 and is shown schematically in FIG. 1, checks whether the motor vehicle 10 is approaching a traffic signal or traffic light that displays a red light signal or has just changed from yellow to red. If this is the case, then the control device 22 controls an actuator in the form of an electric motor, for instance, which causes the sun visor 14 to flip down. Simultaneously or subsequently, the control device 22 actuates a cover 26 in the form of a slider element, which, in its closed position, covers a mirror 28 or vanity mirror of the sun visor 14. In the open position of the cover 26, the female driver can look at herself in the mirror 28.

Formed in the sun visor 14 is a storage compartment 30 or stowage compartment, in which, in FIG. 1, schematically illustrated makeup accessories in the form of a lipstick 32, an eyeliner 34, or a powder compact 36, for instance, are located. The listing of such makeup accessories is merely exemplary and a large number of additional and/or alternative makeup accessories, such as, for instance, facial tissues, eyeshadow pencils, brushes, or the like, can be arranged in the storage compartment 30. The makeup accessories can also be arranged in a dispenser box or in a container of this kind, which can be removed from the storage compartment 30 and individually furnished. A dispenser box of this kind can have a lid, which likewise is opened when the sun visor 14 is flipped down or else is opened afterwards in order for the female driver to have access to the makeup accessories. Through the provision of a variably removable and individually furnishable box or cosmetic case, the female driver can keep handy just those makeup accessories that she wishes to use for completing and/or improving her makeup. Through the positioning of the makeup accessories in the region of the flipped-down sun visor 14, they are easy to handle, and accordingly can be used by the female driver.

In response to a command such as, for instance, "Makeup finished" or "Finished" or "Makeup end," the cover 26 is again brought into its closed position, so that it covers the mirror 28, and the sun visor 14 is again moved electrically into its initial position or stowed position, in which the sun visor 14 is flipped up. After access to the box or the container furnished with the makeup accessories and/or after access to the storage compartment 30, it is possible by way of a simple command to cause the control device 22 to ensure that the mirror 28 is covered with the cover 26 and subsequently to ensure that the sun visor 14 is flipped up.

It can be provided that one of the sun visors 14, 20 assigned to the driver's seat as well as a sun visor 38 assigned to the passenger seat (see FIG. 2) are furnished with the makeup accessories shown schematically in FIG. 2, such as lipsticks 32, eyeliner pencils or eyeliners 34, and the like. The respective storage compartment 30 can also be designed to be different in size, depending on which furnishing variant of the makeup accessories or the dispenser box is decided on by the user of the motor vehicle 10.

When only the driver's seat of the motor vehicle 10 is occupied by the (female) vehicle occupant in the form of the female driver, then the control device 22 can establish very simply that the first sun visor 14 or the second sun visor 20 is to be flipped down in order to make available makeup accessories to the female driver. For this purpose, the control device 22 is in communication link with a seat occupancy sensor 40 or a similar device for detecting a seat occupancy. For seat occupancy detection, a camera can also be utilized. When, by means of the seat occupancy sensor 40, it is established that particular vehicle occupants are present, for example, in the driver's seat and in the passenger seat, then the control device 22 can request that another control input be output. Through evaluation of the additional control input, the control device 22 can establish which of the sun visors 14, 20, 38 are to be flipped down in order to give the vehicle occupant or the vehicle occupants access to the makeup accessories. For example, the control device 22 can output a voice message and ask for the place in the motor vehicle 10 at which the sun visor 14, 20, 38 is to be flipped down. However, it is also possible to communicate by way of another control input, as a voice input of the control device 22, which of the sun visors 14, 20, 38 are to be flipped down.

In accordance with the illustration in FIG. 3, the storage compartment 30 can be furnished with makeup accessories such as the lipstick 32 and a powder compact 36 containing a plurality of eyeshadows, face powders in different colors, and the like. Furthermore, it can be seen from FIG. 3 that, particularly in the case of an electric actuator, a light source 42 is switched on in response to the opening of the cover 26 through actuation by the control device 22. In this way, the female driver can see herself especially well in the mirror 28 or vanity mirror.

It can be seen from the illustration in FIG. 4 that, depending on the size of the storage compartment 30, it is also possible to provide it with a relatively large number of makeup accessories. In accordance with the illustration in FIG. 4, the light source 42 is also switched on when the cover 26 is moved into the open position.

It is also possible to provide, in the region of a backseat bench or of a second or third row of seats of the motor vehicle 10, hinged elements or elements that move automatically into a functional position and close manually or automatically, which, for instance, can be integrated in a roof liner of the motor vehicle 10. These hinged elements, too, can be variably furnished with a corresponding dispenser box for makeup accessories, wherein the dispenser box is preferably designed to be removable.

Here, too, by way of a voice input and/or by way of a pushbutton actuation or a control input on a touchpad and/or on a touchscreen or in a similar manner, it is possible to bring the hinged elements into the functional position. It is also possible to equip a mobile end device, such as a smartphone, with a corresponding convenient application. When the smartphone is connected to the control device 22 via Bluetooth, for instance, it is also possible, via this application, to cause the hinged elements or the sun visors 14, 20, 38 to flip down.

The seat occupancy sensor 40 can preferably also establish a seat occupancy of backseats of the motor vehicle 10 and transmit said seat occupancy to the control device 22. Then, by way of the additional control input of the control device 22, it is communicated which sun visor 14, 20, 38 or which hinged element or similar storage device for makeup accessories is to be brought into the functional position in order to enable the particular vehicle occupant to have access to the makeup accessories.

Overall, the example shows how, through the invention, an "intelligent day makeup look" method can be realized, in which a makeup routine actuation is possible via the camera 24 or front camera and a voice input or Bluetooth control. Thus, when a female driver occupies a driver's seat, the actuation of a makeup functionality can be brought about through the linkage, following, for example, the voice input "Makeup" and, namely, can be carried out, in particular, when a traffic signal is detected to change from yellow to red via a signal from the camera 24.

The invention claimed is:

1. A method for operating a motor vehicle, in which a control device of the motor vehicle receives a control input conducted by a vehicle occupant, wherein by a sensor device of the motor vehicle, it is checked whether at least one predetermined criterion is met, wherein, when the at least one predefined criterion is met and when the control device receives the control input, a movement of at least one sun visor of the motor vehicle from a stowed position into a functional position is brought about, in which the at least one sun visor is flipped down;

wherein, by a device for detecting seat occupancy, it is checked whether a driver's seat of the motor vehicle is occupied, and, when the driver's seat is occupied, at least one sun visor assigned to the driver's seat is moved into the functional position; and wherein, when by the device for detecting seat occupancy, it is detected that at least one vehicle seat arranged in the longitudinal direction of the vehicle behind a driver's seat of the motor vehicle is occupied, a hinged element assigned to this vehicle seat is moved into a functional position, in which the hinged element is flipped down, wherein the control device brings about an opening of a storage compartment that is formed in the hinged element and contains makeup accessories.

2. The method according to claim 1, wherein by the sensor device of the motor vehicle, which is designed as a camera, as the at least one predefined criterion, it is checked whether the motor vehicle is approaching a traffic signal that displays a red light signal or will display a red light signal by the time the motor vehicle arrives at the traffic signal.

3. The method according to claim 1, wherein the control device brings about a movement of a cover of a mirror that is attached to the at least one sun visor from a closed position of the cover into an open position.

4. The method according to claim 1, wherein the control device brings about an opening of a storage compartment that is formed in the at least one sun visor and contains makeup accessories.

5. The method according to claim 4, wherein the control device brings about an opening of a container, in particular a detachable container that is accommodated in the storage compartment and contains makeup accessories.

6. The method according to claim 1, wherein the control input by the vehicle occupant is made as a voice input, and/or as an input on a control element of the motor vehicle, and/or as an input on a mobile end device that is coupled to the control device.

7. The method according to claim 1, wherein by the device for detecting a seat occupancy, it is checked whether at least one vehicle seat different from a driver's seat of the motor vehicle is occupied, and, when at least one vehicle seat is occupied, at least one additional control input of a vehicle occupant is evaluated by the control device, which specifies which sun visor is to be moved into the functional position.

8. A motor vehicle with a control device that is designed for the purpose of receiving a control input conducted by a vehicle occupant, wherein the motor vehicle comprises a sensor device, by means of which it can be checked whether at least one predetermined criterion is met, wherein the control device is designed for bringing about a movement of at least one sun visor of the motor vehicle from a stowed position into a functional position, in which the at least one sun visor is flipped down, when the at least one predefined criterion is met and the control input is received;

wherein, by a device for detecting seat occupancy, it is checked whether a driver's seat of the motor vehicle is occupied, and, when the driver's seat is occupied, at least one sun visor assigned to the driver's seat is moved into the functional position; and wherein, when by the device for detecting seat occupancy, it is detected that at least one vehicle seat arranged in the longitudinal direction of the vehicle behind a driver's seat of the motor vehicle is occupied, a hinged element assigned to this vehicle seat is moved into a functional position, in which the hinged element is flipped down, wherein the control device brings about an opening of a storage compartment that is formed in the hinged element and contains makeup accessories.

9. The method according to claim 5, wherein removal of the container from the storage compartment exposes a mirror that is arranged in the storage compartment.

\* \* \* \* \*